(12) United States Patent
Takahashi et al.

(10) Patent No.: US 10,978,823 B2
(45) Date of Patent: Apr. 13, 2021

(54) WATERPROOF PACKING, WATERPROOF CONNECTOR AND WIRE HARNESS

(71) Applicant: YAZAKI CORPORATION, Tokyo (JP)

(72) Inventors: Kazuhide Takahashi, Makinohara (JP); Shoichi Nomura, Makinohara (JP); Eiji Aoki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/716,432

(22) Filed: Dec. 16, 2019

(65) Prior Publication Data

US 2020/0212620 A1 Jul. 2, 2020

(30) Foreign Application Priority Data

Dec. 27, 2018 (JP) .............................. JP2018-245021

(51) Int. Cl.
*H01R 13/52* (2006.01)
*H01R 13/6596* (2011.01)
*H01R 13/6592* (2011.01)

(52) U.S. Cl.
CPC ..... *H01R 13/5205* (2013.01); *H01R 13/5221* (2013.01); *H01R 13/6592* (2013.01); *H01R 13/6596* (2013.01)

(58) Field of Classification Search
CPC ............ H01R 13/5205; H01R 13/5221; H01R 13/6592; H01R 13/6596; H01R 13/516; H01R 13/518; H01R 13/6591; H01R 13/648; H01R 13/6581; H01R 13/658; H01R 13/655; H01R 13/652; H01R 13/52; H01R 13/46

USPC ....... 439/587, 271, 272, 273, 274, 275, 279, 439/281, 282, 548, 556, 559, 604
See application file for complete search history.

(56) References Cited

U.S. PATENT DOCUMENTS

| | | | | |
|---|---|---|---|---|
| 2,909,740 | A | * 10/1959 | Bell | .................... C08L 2666/14 336/90 |
| 4,222,029 | A | * 9/1980 | Marquis, III | .......... B60K 13/02 210/90 |
| 5,165,834 | A | 11/1992 | Takenouchi et al. | |

(Continued)

FOREIGN PATENT DOCUMENTS

| | | |
|---|---|---|
| JP | H4-3114 U | 1/1992 |
| JP | 2009-104837 A | 5/2009 |

(Continued)

*Primary Examiner* — Harshad C Patel
(74) *Attorney, Agent, or Firm* — Kenealy Vaidya LLP (57) ABSTRACT

A wire harness includes at least one electrically conductive path, a waterproof connector, a tubular shield member and a shield shell. The waterproof connector includes a waterproof packing a connector housing and a terminal. The waterproof packing includes a cylindrical packing body and a heat transfer member, the heat transfer member being provided integrally with the cylindrical packing body. The heat transfer member of the waterproof packing is formed of metal, the heat transfer member being configured to transfer heat from the connector housing. The heat transfer member is configured to transfer the heat from the connector housing of the waterproof connector to the metal case when the waterproof packing of the waterproof connector is inserted into an insertion hole of the metal case.

11 Claims, 7 Drawing Sheets

(56) References Cited

U.S. PATENT DOCUMENTS

| | | | |
|---|---|---|---|
| 5,201,625 A | 4/1993 | Takenouchi et al. | |
| 7,455,541 B2 * | 11/2008 | Jackson | H01R 13/5205 |
| | | | 439/274 |
| 7,690,936 B1 * | 4/2010 | Snekkevik | H01R 13/523 |
| | | | 439/281 |
| 7,901,240 B2 * | 3/2011 | Jackson | H01R 4/5025 |
| | | | 439/465 |
| 9,722,349 B2 * | 8/2017 | Ishihara | H01R 13/5202 |
| 10,821,921 B2 * | 11/2020 | Shigyo | H01R 12/716 |
| 2001/0049226 A1 * | 12/2001 | Murakami | H01R 13/5205 |
| | | | 439/587 |
| 2007/0170656 A1 | 7/2007 | Schleker et al. | |
| 2011/0275231 A1 | 11/2011 | Nagano et al. | |
| 2015/0288090 A1 * | 10/2015 | Shigeta | H01R 13/5202 |
| | | | 439/587 |
| 2015/0295363 A1 * | 10/2015 | Wang | H01R 13/65912 |
| | | | 439/578 |
| 2017/0334375 A1 * | 11/2017 | Shigyo | H02G 3/16 |

FOREIGN PATENT DOCUMENTS

| | | |
|---|---|---|
| JP | 2011-127771 A | 6/2011 |
| JP | 2014-127241 A | 7/2014 |
| WO | 2010/113243 A1 | 10/2010 |

* cited by examiner

WATERPROOF PACKING, WATERPROOF CONNECTOR AND WIRE HARNESS

CROSS-REFERENCE TO RELATED APPLICATION

The present application claims priority to Japanese Patent Application No. 2018-245021 filed on Dec. 27, 2018, the entire content of which is incorporated herein by reference.

TECHNICAL FIELD

The present invention relates to a waterproof packing used for a portion to be waterproofed. The present invention also relates to a waterproof connector and a wire harness including the waterproof packing.

BACKGROUND

A related art connector has a waterproof function and a shield function, and is to be attached to a metal case of an object to be connected (see, for example, JP 2014-127241A). A body of a connector is inserted into an insertion hole formed in the metal case, and a waterproof packing is disposed in a gap between the insertion hole and the body. The gap is sealed by the waterproof packing. An example of such a connector will be described below.

Figure 7:
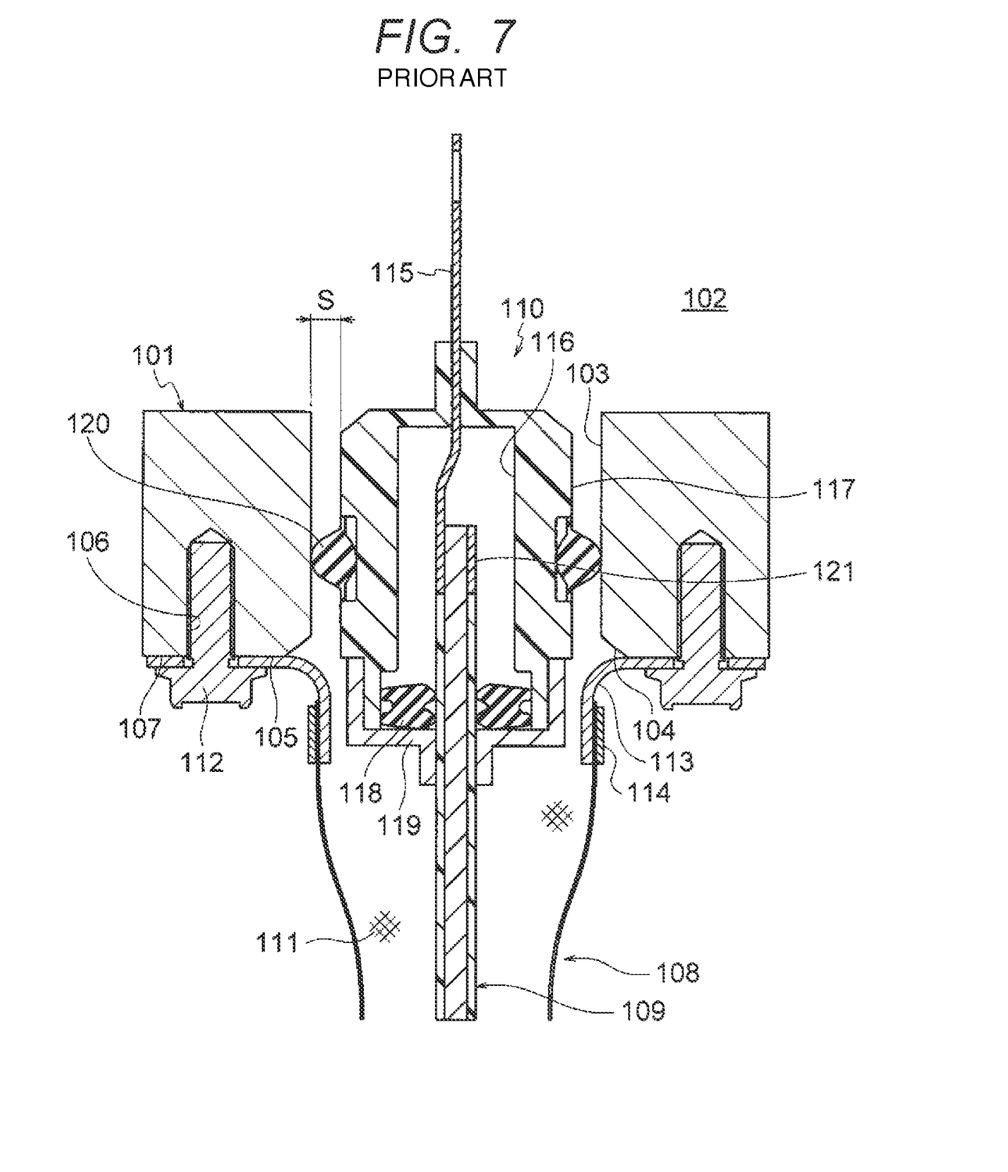
FIG. 7 is a cross-sectional view of a wire harness end part in a related art.

In FIG. 7, a reference numeral 101 denotes a metal case of an object to be connected. A terminal base (not illustrated) is provided in an inner side 102 of the metal case 101. An insertion hole 103 is formed in the metal case 101, the position of which is decided in accordance with arrangement of the terminal base (not illustrated). A shell connection surface 105 and a female screw portion 106 are formed on a periphery of an opening 104 of the insertion hole 103. The shell connection surface 105 and the female screw portion 106 are formed on an outer surface 107 of the metal case 101. A reference numeral 108 denotes a wire harness. The wire harness 108 includes an electric wire 109 which is an electrically conductive path, a waterproof connector 110 provided at an end of the electric wire 109, a tubular braid 111 covering the electric wire 109, a shield shell 113 provided on an end of the tubular braid 111 and to be fixed to the shell connection surface 105 by a bolt 112, and a shield ring 114 configured to fix the shield shell 113 to the end of the tubular braid 111.

The waterproof connector 110 is inserted into the insertion hole 103. The waterproof connector 110 includes a metal terminal 115 connected to the end of the electric wire 109, a resin connector housing 117 having a terminal containing chamber 116, a rubber plug 118 configured to seal a gap between the terminal containing chamber 116 and the electric wire 109, a rear holder 119 configured to prevent the rubber plug 118 from coming off, and a waterproof packing 120 attached to an outside of the connector housing 117. The waterproof connector 110 is formed to have a size such that a gap S is secured such that the waterproof connector 110 can be inserted into and pulled out from the insertion hole 103. Although the gap S is secured, the gap S between the connector housing 117 and the insertion hole 103 is sealed by the waterproof packing 120.

In the related art illustrated in FIG. 7, there is the gap S between the resin connector housing 117 and the metal case 101 (insertion hole 103). Therefore, heat generated at a terminal crimping portion 121 or the like inside the connector housing 117 is hardly transmitted to the metal case 101 via the connector housing 117. Therefore, there is a problem that thermal conductivity (heat dissipation) is poor in terms of structure. A temperature rise value at a side of the waterproof connector 110 is increased if the thermal conductivity worsens. As a result, it is necessary to use a heat-resistant electric wire or a heat-resistant housing material.

SUMMARY

Illustrative aspects of the present invention provide a waterproof packing having high thermal conductivity, and a waterproof connector and a wire harness including the waterproof packing.

According to an illustrative aspect of the present invention, a wire harness includes at least one electrically conductive path a waterproof connector provided at an end of the at least one electrically conductive path a tubular shield member configured to cover the at least one electrically conductive path and a shield shell provided on an end of the tubular shield member, the shield shell being configured to be attached to a metal case of an object to which the wire harness is connected. The waterproof connector includes: a waterproof packing; a connector housing to which the waterproof packing is attached on an outer side of the connector housing; and a terminal configured to be connected to an end of the at least one electrically conductive path, the terminal accommodated inside the connector housing. The waterproof packing includes: a cylindrical packing body having elasticity; and a heat transfer member having higher thermal conductivity than the cylindrical packing body, the heat transfer member being provided integrally with the cylindrical packing body. The heat transfer member of the waterproof packing is formed of metal, the heat transfer member being configured to transfer heat from the connector housing. The heat transfer member is configured to transfer the heat from the connector housing of the waterproof connector to the metal case when the waterproof packing of the waterproof connector is inserted into an insertion hole of the metal case.

Other aspects and advantages of the invention will be apparent from the following description, the drawings and the claims.

DESCRIPTION OF EMBODIMENTS

Hereinafter, exemplary embodiments of the present invention will be described in detail with reference to the drawings.

According to an illustrative aspect of the present invention, a wire harness includes at least one electrically conductive path, a waterproof connector provided at an end of the at least one electrically conductive path, a tubular shield member configured to cover the at least one electrically conductive path and a shield shell provided on an end of the tubular shield member, the shield shell being configured to be attached to a metal case of an object to which the wire harness is connected. The waterproof connector includes a waterproof packing, a connector housing to which the waterproof packing is attached on an outer side of the connector housing, and a terminal configured to be connected to an end of the at least one electrically conductive path, the terminal accommodated inside the connector housing. The waterproof packing includes a cylindrical packing body having elasticity and a heat transfer member having higher thermal conductivity than the cylindrical packing body, the heat transfer member being provided integrally with the cylindrical packing body. The heat transfer member of the waterproof packing is formed of metal, the heat transfer member being configured to transfer heat from the connector housing. The heat transfer member is configured to transfer the heat from the connector housing of the waterproof connector to the metal case when the waterproof packing of the waterproof connector is inserted into an insertion hole of the metal case.

Since the waterproof packing includes the heat transfer member, the waterproof packing have high thermal conductivity. The waterproof connector and the wire harness according to the present invention includes the waterproof packing. Accordingly, the waterproof connector and the wire harness have high thermal conductivity.

Since the heat transfer member is in direct contact with the connector housing and the insertion hole, heat conduction efficiency can be further improved.

In the waterproof connector, the heat transfer member of the waterproof packing may be formed of metal, and may be formed to promote heat transfer from the connector housing.

According to the waterproof connector, if the heat transfer member is formed of metal, it is possible to promote heat transfer from the connector housing as well as a heat generation source inside the connector housing to, for example, the metal case of the object to be connected (described below). The present invention does not exclude a heat transfer member formed of resin.

Figure 1:
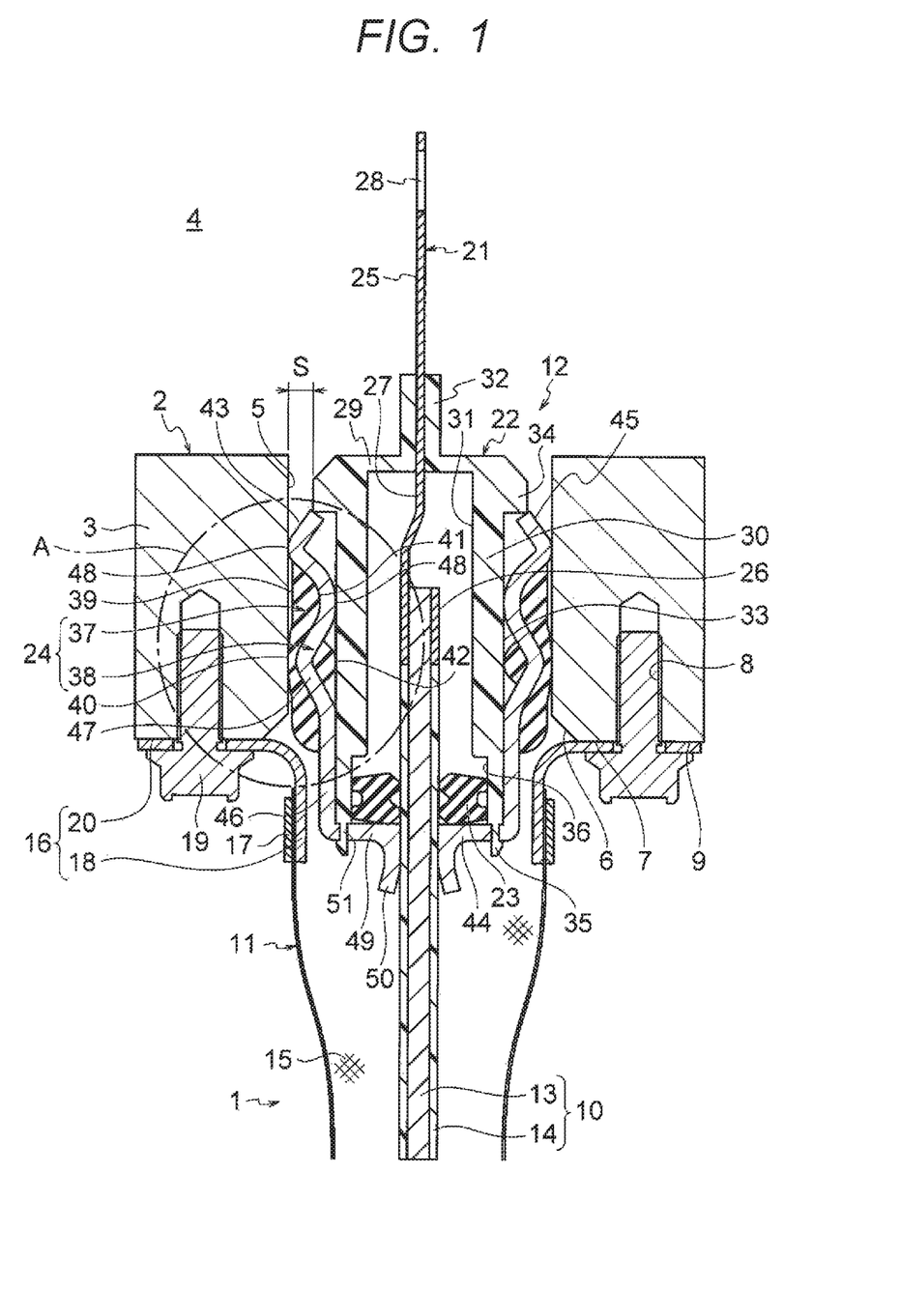
FIG. 1 is a cross-sectional view illustrating a wire harness end part including a waterproof packing according to an embodiment of the present invention.
Figure 2:
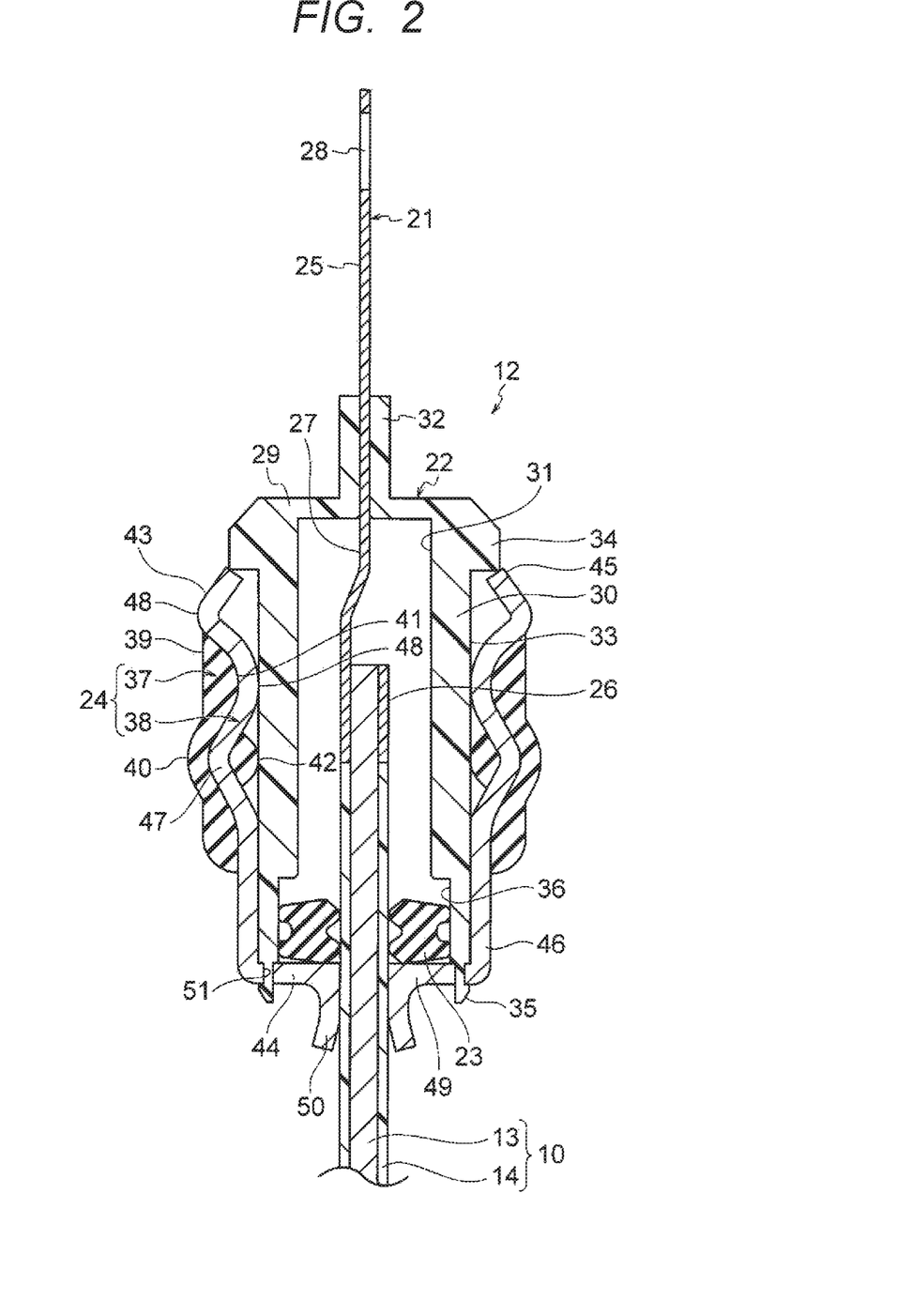
FIG. 2 is an enlarged view of a waterproof connector part in FIG. 1.
Figure 3:
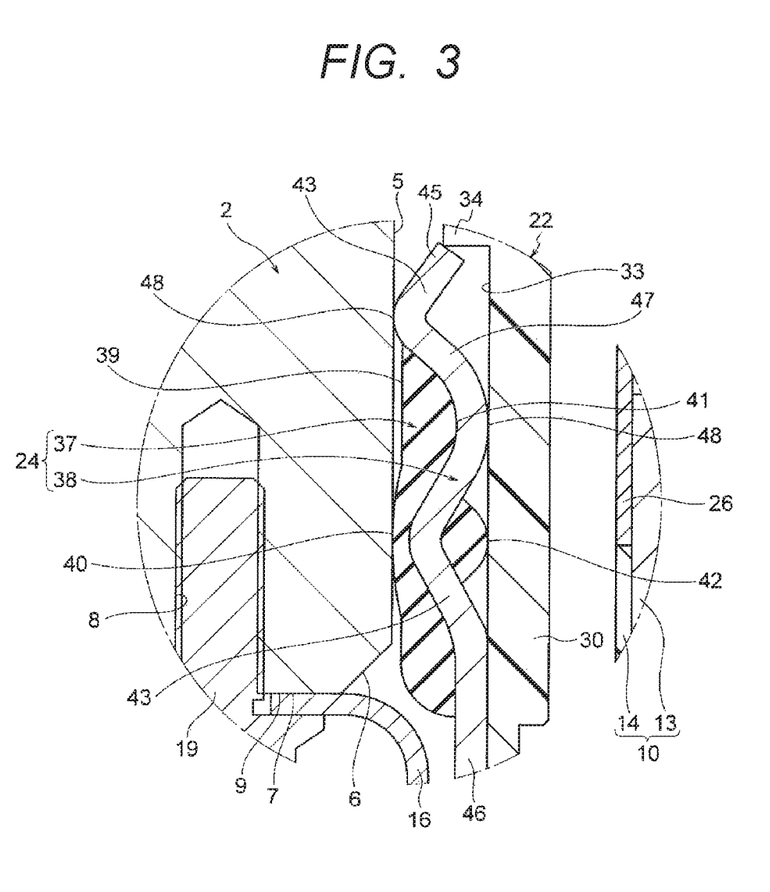
FIG. 3 is an enlarged view of a circle A part in FIG. 1.

An embodiment will be described below with reference to the drawings. FIG. 1 is a cross-sectional view illustrating a wire harness end part including a waterproof packing according to the embodiment of the present invention. FIG. 2 is an enlarged view of a waterproof connector part in FIG. 1. FIG. 3 is an enlarged view of a circle A part in FIG. 1.

In FIG. 1, a reference numeral 1 denotes a wire harness configured to perform electrical connection with an object to be connected. A reference numeral 2 denotes a metal case of the object to be connected. An object to be connected is, for example, a body of an in-vehicle device, and the wire harness 1 connected to the body of the in-vehicle device is wired in a vehicle which is an automobile or the like. The metal case 2 has a structure that surrounds the object to be connected and is grounded to a vehicle body or the like. A terminal base (not illustrated) is provided on an inner side 4 of a connector attachment wall 3 in the metal case 2. An insertion hole 5 runs through the connector attachment wall 3 and a position of the insertion hole 5 is decided in accordance with a position of the terminal base. A shell connection surface 7 and a female screw portion 8 are formed on a periphery of an opening 6 of the insertion hole 5. The shell connection surface 7 and the female screw portion 8 are formed on an outer surface 9 of the metal case 2. The wire harness 1 includes one or a plurality of electric wires 10 (electrically conductive paths), a shield unit 11 configured to cover the electric wire 10, and a waterproof connector 12 provided.

As shown in FIGS. 1 and 2, the electric wire 10 includes an electrically conductive metal conductor 13 and an electrically insulating resin insulator 14 configured to cover the conductor 13. The electric wire 10 has flexibility from one end to the other end. In the embodiment, the electric wire 10 without a sheath is used (one example). Since the electric wire 10 does not include a sheath, the electric wire 10 is lighter (if the electric wire 10 is long, the electric wire 10 can be significantly reduced in weight as compared with that including a sheath). The conductor 13 is formed to have a circular cross section and made of a copper, a copper alloy, or an aluminum or an aluminum alloy. The conductor 13 may be a conductor structure formed as twisted strands or a rod having a circular cross section (a round shaped cross section) (for example, the conductor 13 may be a round single-core conductor structure, and in this case, the electric wire 10 itself is also rod-shaped). The insulator 14 formed of an electrically insulating resin material is extruded and molded on an outer surface of the conductor 13 as described above. The insulator 14 is extruded and molded on an outer peripheral surface of the conductor 13 using a thermoplastic resin material. The insulator 14 is formed as a coating having a circular cross section. The insulator 14 is formed to have a predetermined thickness. As the thermoplastic resin used for manufacturing the insulator 14, various known types of thermoplastic resin can be used, and the thermoplastic resin can selected from polymer materials such as a polyvinyl chloride resin, a polyethylene resin, a polypropylene resin, and the like. Also, a bus bar or the like may be used instead of the electric wire 10.

As shown in FIG. 1, the shield unit 11 includes a tubular braid 15 (a shield member) configured to cover the electric wire 10, a shield shell 16 provided on a end of the tubular braid 15, and a shield ring 17 configured to fix the shield shell 16 to the end of the tubular braid 15. The braid 15 is formed by knitting ultrafine metal strands having conductivity into a tubular shape. The braid 15 is formed to have a length slightly shorter than that of the electric wire 10. A metal foil or a sheet member including a metal foil may be used instead of the braid 15. The shield shell 16 is an electrically conductive metal member, and is shaped such that a part having an L-shaped cross section is formed in an annular shape. Specifically, the shield shell 16 includes a braid fixing portion 18 fixed to the end of the tubular braid 15 and a case fixing portion 20 fixed to the shell connection surface 7 of the connector attachment wall 3 by a bolt 19, and is formed as an annular part having the annular shape. The braid fixing portion 18 is formed to have a size so as to surround a rear holder 44 of a heat transfer member 38 of a waterproof packing 24 (described below). The braid 15 is grounded via the shield shell 16 and the metal case 2. The shield ring 17 is formed as an annular member such that the end of the tubular braid 15 can be sandwiched between the shield ring 17 and the braid fixing portion 18 by crimping.

As shown in FIGS. 1 and 2, the waterproof connector 12 is provided at the end of the electric wire 10 as described above. The waterproof connector 12 is attached by being inserted into the insertion hole 5 of the metal case 2. The waterproof connector 12 is used to perform electrical connection with the object to be connected. The waterproof connector 12 includes a terminal 21, a connector housing 22, a rubber plug 23, and the waterproof packing 24. The waterproof connector 12 includes the rubber plug 23 and the waterproof packing 24 so as to prevent moisture from entering the inner side 4 of the metal case 2. In the present invention, the waterproof packing 24 is provided to release and dissipate heat generated in the waterproof connector 12 to the metal case 2. In other words, the waterproof packing 24 is provided to promote heat transfer to the metal case 2 (the heat transfer will be described below).

As shown in FIGS. 1 and 2, the terminal 21 is formed by pressing an electrically conductive metal plate. As illustrated in the drawings, the terminal 21 is a male terminal, and includes an electrical contact portion 25, an electric wire connection portion 26, and an intermediate portion 27. The electrical contact portion 25 is formed in a tab shape. The electrical contact portion 25 is formed to be connected to the terminal base (not illustrated) of the object to be connected. A bolt insertion hole 28 for the terminal 21 to be connected with the terminal base is formed in the electrical contact portion 25. The electric wire connection portion 26 is formed to crimp the conductor 13 exposed at the end of the electric wire 10. The electric wire connection portion 26 according to the embodiment is formed as a terminal crimping portion. The electric wire connection portion 26, which is the terminal crimping portion, generates heat during energization. An end portion of the insulator 14 may also be crimped. The intermediate portion 27 is formed to connect the electrical contact portion 25 and the electric wire connection portion 26. The intermediate portion 27 is formed at a part of the terminal 21, the part being continuous with the electrical contact portion 25 and the part being held in the connector housing 22.

As shown in FIGS. 1 and 2, the connector housing 22 is an electrically insulating resin member, and has a size with which the connector housing 22 can be inserted into the insertion hole 5 of the metal case 2 and the connector housing 22 can secure a gap S between the connector housing 22 and the insertion hole 5. The connector housing 22 includes a front wall 29, side walls 30 extending rearward from the front wall 29, and a terminal containing chamber 31 formed inside the side walls 30, and the connector housing 22 is formed in an illustrated shape. A terminal holding portion 32 protruding toward the inner side 4 of the metal case 2 is formed on the front wall 29. A continuous part of the intermediate portion 27 and the electrical contact portion 25 of the terminal 21 is inserted into the terminal holding portion 32. A packing contact surface 33, with which the waterproof packing 24 is in watertight contact and which the heat transfer member 38 (described below) contacts, is formed on an outer surface of side wall 30. A packing stopper 34, which the waterproof packing 24 abuts, is formed on the outer surface of side wall 30 adjacent to the front wall 29. A packing locking portion 35 configured to lock the waterproof packing 24 is formed at a rear end of side wall 30. A rubber plug contact surface 36, with which the rubber plug 23 is in watertight contact, is formed on a rear end side of an inner surface of side wall 30.

As shown in FIGS. 1 and 2, the rubber plug 23 is provided to prevent moisture from entering the inner side 4 of the metal case 2 as described above. The rubber plug 23 is a rubber seal member having elasticity and is formed in an annular shape. The rubber plug 23 is attached to the electric wire 10 before the terminal 21 is crimped. The rubber plug 23 is formed with an inner peripheral lip (reference numeral omitted) which is in watertight contact with an outer surface of the electric wire 10. The rubber plug 23 is also formed with an outer peripheral lip (reference numeral omitted) which is in watertight contact with the rubber plug contact surface 36 of the connector housing 22. A material to manufacture the rubber plug 23 is not particularly limited, but a material such as silicon, acrylic, or the like is mainly used.

As shown in FIGS. 1 to 3, the waterproof packing 24 is attached to the connector housing 22. The waterproof packing 24 is provided to prevent moisture from entering the inner side 4 of the metal case 2 as described above. The waterproof packing 24 is provided to promote heat transfer to the metal case 2 as described above. The waterproof packing 24 includes a packing body 37 and the heat transfer member 38. The configuration of the waterproof packing 24 will be described below.

As shown in FIGS. 1 to 3, the packing body 37 is a rubber seal member having elasticity similar to the rubber plug 23. A material thereof is mainly silicon, acrylic, or the like. However, an electrically conductive rubber material may also be used for a purpose of improving thermal conductivity. The packing body 37 is formed as a cylindrical member that fits a shape of the connector housing 22 to which the packing body 37 is to be attached (specifically, the packing body 37 is formed as a cylindrical member that fits the packing contact surface 33). One annular outer peripheral lip 40 is formed on an outer surface 39 of the packing body 37. Also, one annular inner peripheral lip 42 is formed on an inner surface 41 of the packing body 37. The outer peripheral lip 40 protrudes outward from the outer surface 39. The outer peripheral lip 40 has a mountain shaped cross-section. The outer peripheral lip 40 encircles the outer surface 39 for an entire circumference of a circle defined by the outer surface 39 in a circumferential direction. The inner peripheral lip 42 protrudes inward from the inner surface 41. The inner peripheral lip 42 has a mountain shaped cross-section. The inner peripheral lip 42 extends along the inner surface 41 for an entire inner circumference of a circle defined by the inner surface 41 in a circumferential direction. The outer peripheral lip 40 and the inner peripheral lip 42 according to the embodiment are formed at the same positions in an upper-lower direction in the drawings although sizes and shapes of the outer peripheral lip 40 and the inner peripheral lip 42 are slightly different. The outer surface 39 of the packing body 37 is formed such that a minute gap is provided between the outer surface 39 of the packing body 37 and the insertion hole 5.

As shown in FIGS. 1 to 3, the heat transfer member 38 is integrated with the packing body 37. In other words, the heat transfer member 38 is insert-molded in the packing body 37. The heat transfer member 38 has higher thermal conductivity than the packing body 37. The heat transfer member 38 is configured to facilitate transfer of heat generated in the terminal crimping portion or the like to the metal case 2 via the connector housing 22. That is, the heat transfer member 38 is configured to promote heat transfer to the metal case 2. The heat transfer member 38 is a metal member in the embodiment. The heat transfer member 38 is formed in a bottomed cylindrical shape. The heat transfer member 38 may be made of resin as long as the heat transfer member 38 has high thermal conductivity. The heat transfer member 38 is not limited to the bottomed cylindrical shape, and may have a cylindrical shape of only a heat transfer member body 43 (described below). The heat transfer member 38 includes the heat transfer member body 43 and a rear holder 44.

As shown in FIGS. 1 to 3, the heat transfer member body 43 is provided as a cylindrical part that is integrated with the packing body 37. The heat transfer member body 43 includes a distal end portion 45, a base end portion 46, a curved portion 47, and contact portions 48, and has a cross-sectional shape as illustrated in the drawings. The distal end portion 45 is an opening portion of the cylindrical heat transfer member body 43, and is formed as a portion (a portion to be hooked) that abuts the packing stopper 34 of the connector housing 22. The base end portion 46 is continuous with the rear holder 44, and is formed to be attached to the packing contact surface 33 (a rear end side on the outer surface of side wall 30) of the connector housing 22. The base end portion 46 is provided as a part where no spring property is generated (described below). The curved portion 47 and the contact portions 48 are arranged and formed between the distal end portion 45 and the base end portion 46. The curved portion 47 has a wave shaped cross-section. The curved portion 47 is formed to have a spring property such that the contact portions 48 relatively moves due to the above-described shape having the wave shaped cross-section. The contact portions 48 are formed using the above-described shape of the curved portion 47. The contact portions 48 are exposed from a part of each of the outer surface 39 and the inner surface 41 of the packing body 37 so as to be in contact with the insertion hole 5 of the metal case 2 and the packing contact surface 33 of the connector housing 22. Heat generated in the terminal crimping portion or the like due to contact of the contact portions 48 is transmitted from the connector housing 22 to the contact portion 48 exposed on the inner surface 41 of the packing body 37, from the contact portion 48 exposed on the inner surface 41 of the packing body 37 to the contact portion 48 exposed on the outer surface 39 of the packing body 37, from the contact portion 48 exposed on the outer surface 39 of the packing body 37 to the insertion hole 5 of the metal case 2, and is finally dissipated at a part of the metal case 2 having a large surface area. The heat transfer member body 43 can transfer heat effectively when being in contact with the connector housing 22 and the insertion hole 5. It is a matter of course that heat can be transferred even when the heat transfer member body 43 is in contact with either one of the connector housing 22 and the insertion hole 5 (it is a matter of course that the heat transferring effect can be obtained as compared with a case using only a packing (in a related art)).

As shown in FIGS. 1 and 2, the rear holder 44 is formed to cover a rear end side of side wall 30 of the connector housing 22. The rear holder 44 is formed to exhibit the same function as the rear holder 119 in the related art (see FIG. 7). An electric wire holding portion 50 protruding toward an outside of the metal case 2 is formed on a bottom wall 49 of the rear holder 44. The electric wire holding portion 50 is arranged at a center position of the bottom wall 49. The electric wire 10 runs through the electric wire holding portion 50. A locked portion 51 is formed on the bottom wall 49 at a position axially outside the electric wire holding portion 50. The locked portion 51 is to be locked by the packing locking portion 35 at the rear end of side wall 30.

The waterproof packing 24 has a structure in which the rear holder 44 is integrated. Therefore, the waterproof packing 24 can be attached to the electric wire 10 before the terminal 21 is crimped. More specifically, the waterproof packing 24 can be attached to the electric wire 10 before the rubber plug 23 is attached to the electric wire 10.

As described above with reference to FIGS. 1 to 3, the waterproof packing 24 according to the embodiment of the present invention is not a packing configured to merely provide a waterproof function, but a packing that can enhance the heat conductivity by virtue of the heat transfer member 38 integrally formed with the waterproof packing 24. In other words, heat conduction efficiency in a direction (a thickness direction of the packing body 37) of the outer surface 39 and the inner surface 41 of the packing body 37 can be improved as compared to that in the related art. The packing body 37 itself preferably has high thermal conductivity. For example, an electrically conductive rubber material may be used to enhance the thermal conductivity of the packing body 37. According to the waterproof packing 24, the packing body 37 has a high repulsive force regardless of its own hardness by virtue of a reaction force due to the spring property of the heat transfer member 38, and as a result, a sealing performance can be enhanced as compared to that in the related art. It is possible to reduce an influence of "sagging" incurred by the packing material due to a high temperature by virtue of the reaction force, and as a result, it is possible to ensure a stable sealing property. It is also possible to reduce or prevent swinging due to vibration of the connector housing 22, to which the packing body 37 is to be attached, by virtue of the reaction force.

The waterproof connector 12 and the wire harness 1 according to the embodiment of the present invention include the waterproof packing 24 in the configuration. Accordingly, the better waterproof connector 12 and the better wire harness 1 having high thermal conductivity can be provided. A rise of temperature at a side of waterproof connector 12 can be reduced or prevented by the waterproof packing 24. Therefore, it is not necessary to use a heat-resistant electric wire or a heat-resistant housing material, which can contribute to cost reduction.

Figure 4:
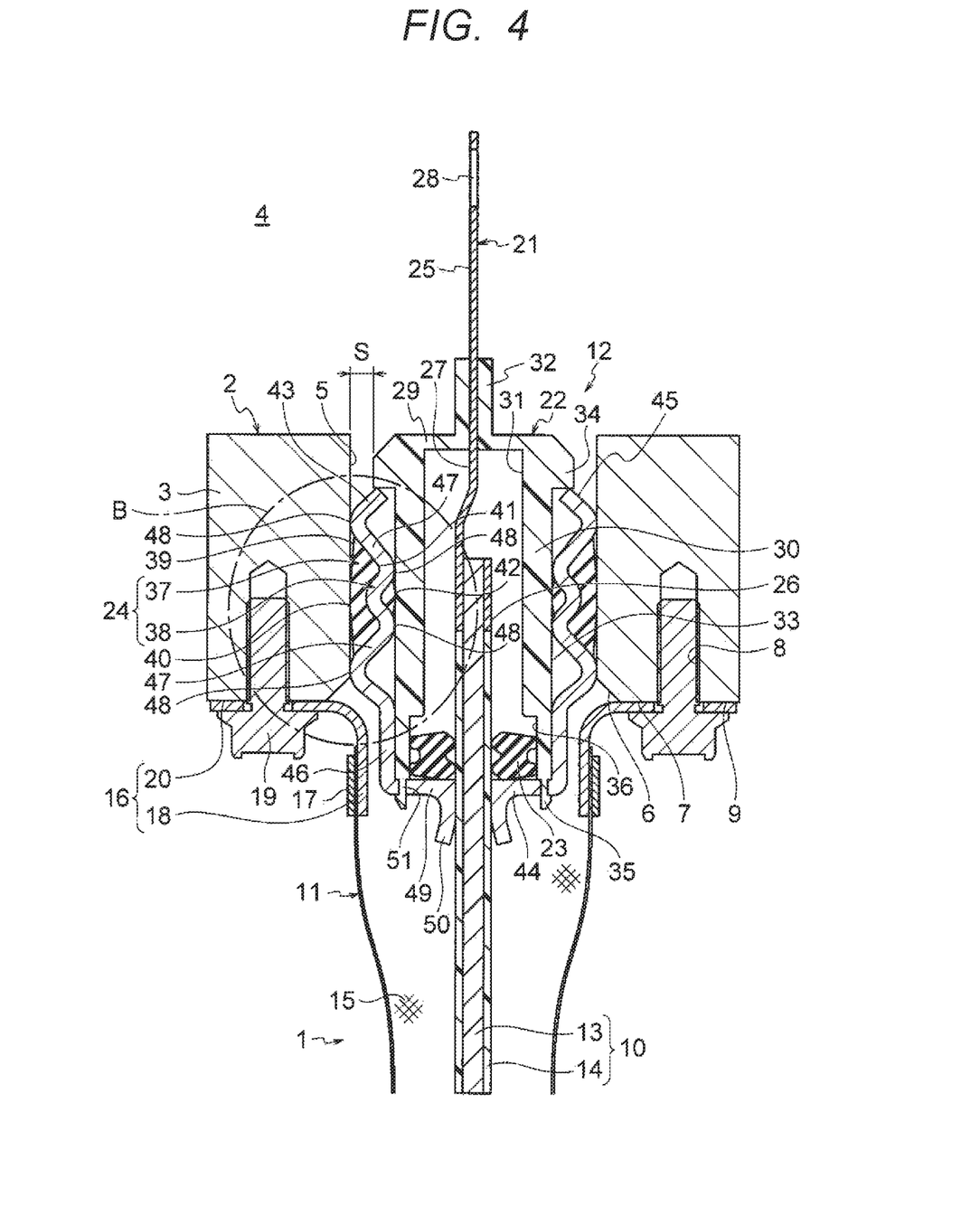
FIG. 4 is a cross-sectional view illustrating a wire harness end part including the waterproof packing according to another embodiment of the present invention.
Figure 5:
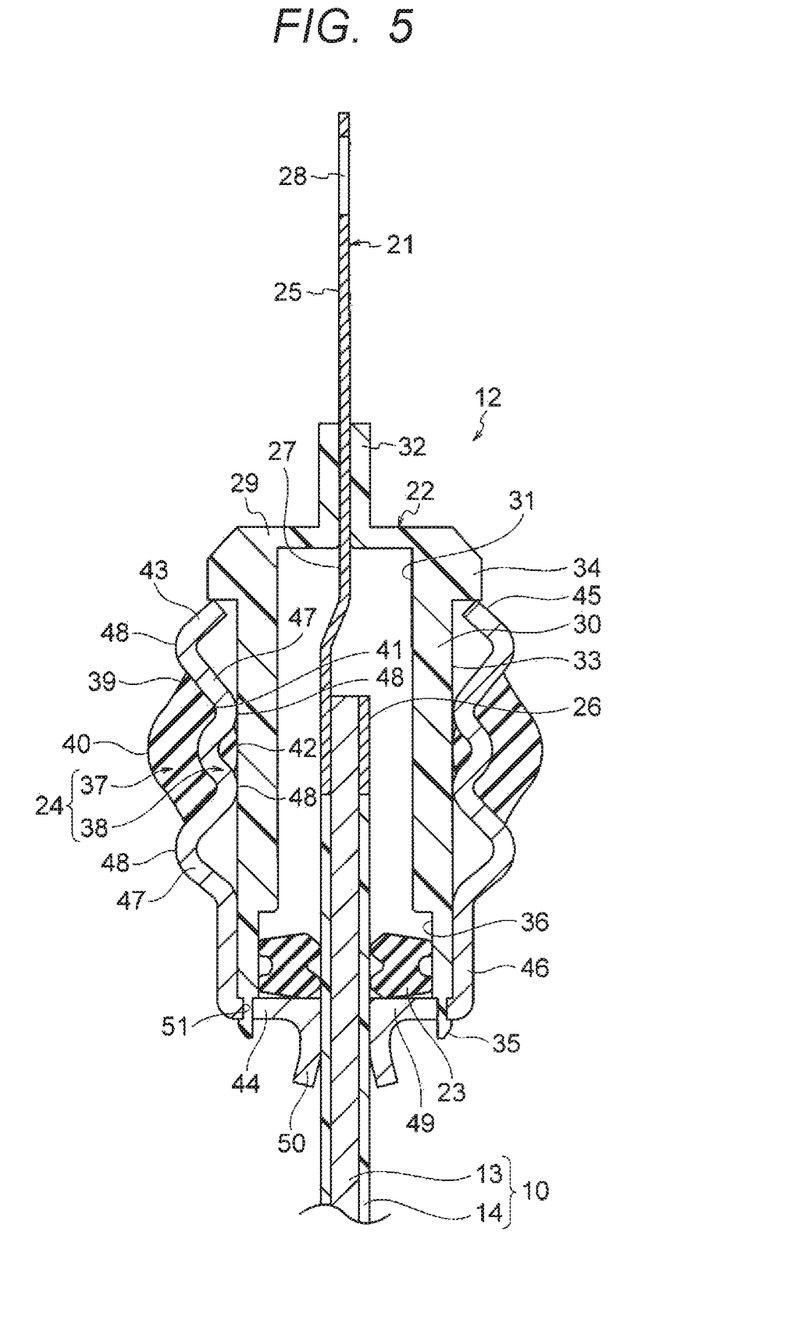
FIG. 5 is an enlarged view of a waterproof connector part in FIG. 4.
Figure 6:
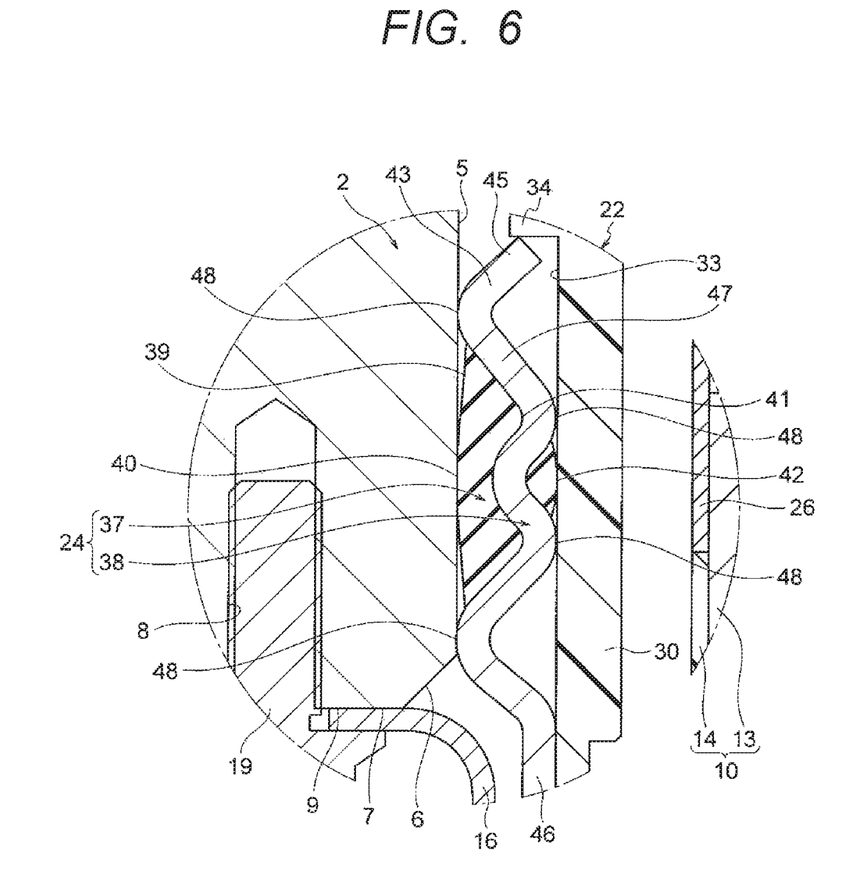
FIG. 6 is an enlarged view of a circle B part in FIG. 4.

Another embodiment will be described below with reference to the drawings. FIG. 4 is a cross-sectional view illustrating a wire harness end part including the waterproof packing according to the another embodiment of the present invention. FIG. 5 is an enlarged view of a waterproof connector part in FIG. 4. FIG. 6 is an enlarged view of a circle B part in FIG. 4. The substantially same components as those in the embodiment are denoted by the same reference numerals, and a detailed description thereof is omitted.

As shown in FIG. 4, the wire harness 1 includes the electric wire 10, the shield unit 11 configured to cover the electric wire 10, and the waterproof connector 12 provided at the end of the electric wire 10. The metal case 2 includes the connector attachment wall 3. The insertion hole 5 runs through the connector attachment wall 3. The shell connection surface 7 and the female screw portion 8 are formed on the periphery of the opening 6 of the insertion hole 5. The shell connection surface 7 and the female screw portion 8 are formed on the outer surface 9 of the metal case 2.

As shown in FIGS. 4 to 6, the waterproof connector 12 includes the terminal 21, the connector housing 22, the rubber plug 23, and the waterproof packing 24. The waterproof connector 12 according to the another embodiment is slightly different from that of the embodiment regarding the waterproof packing 24. More specifically, the difference is that the contact portions 48 are exposed at two positions of each of the outer surface 39 and the inner surface 41 of the packing body 37 such that the contact portions 48 contact the insertion hole 5 of the metal case 2 at the two positions and the packing contact surface 33 of the connector housing 22 at the two positions. In the another embodiment, the number of the positions at which the contact portions 48 contacts the insertions hole 5 and the packing contact surface 33 is larger than that in the embodiment. Arrangement of the contact portions 48 is shifted in the upper-lower direction as in the drawings.

As described above with reference to FIGS. 4 to 6, it is a matter of course that the another embodiment also has the same effect as that of the embodiment.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A waterproof packing comprising:
   a cylindrical packing body having elasticity and being an annular structure having a first annular inner surface and a first annular outer surface; and
   a heat transfer member having higher thermal conductivity than the cylindrical packing body, the heat transfer member being provided integrally with the cylindrical packing body, the heat transfer member being an annular structure having a second annular inner surface that is located inside the first annular inner surface of the cylindrical packing body.

2. The waterproof packing according to claim 1, wherein the heat transfer member comprises a plurality of contact portions exposed to an outside of the packing body, and
   wherein the plurality of contact portions comprises a first contact portion provided on the first annular outer surface of the cylindrical packing body and a second contact portion provided on the first annular inner surface of the cylindrical packing body.

3. The waterproof packing according to claim 2, wherein the heat transfer member is configured to be resilient such that the first contact portion and the second contact portion are movable relative to each other.

4. The waterproof packing according to claim 1, wherein the heat transfer member comprises a base end portion, a distal end portion, and the curved portion formed between the base end portion and the distal end portion, and
   the curved portion has a wave shaped cross-section.

5. The waterproof packing according to claim 1, wherein the cylindrical packing body has an annular inner peripheral lip protruding from the second annular inner surface of the heat transfer member.

6. The waterproof packing according to claim 1, wherein a portion of the first annular inner surface of the cylindrical packing body and a portion of the second annular inner surface of the heat transfer member form a third annular inner surface of the waterproof packing, the heat transfer member includes a second annular outer surface, and
   a portion of the first annular outer surface of the cylindrical packing body and a portion of the second annular outer surface of the of the heat transfer member form a third annular outer surface of the waterproof packing.

7. The waterproof packing according to claim 1, wherein the heat transfer member extends into the cylindrical packing body such that a portion of the heat transfer member is located between the first annular inner surface of the cylindrical packing body and the first annular outer surface of the cylindrical packing body.

8. The waterproof packing according to claim 1, wherein the heat transfer member includes a second annular outer surface, and the first annular inner surface of the cylindrical packing member abuts the second annular outer surface of the heat transfer member.

9. A waterproof connector comprising:
   a waterproof packing;
   a connector housing to which the waterproof packing is attached on an outer side of the connector housing; and
   a terminal configured to be connected to an end of an electrically conductive path, the terminal accommodated inside the connector housing
   wherein the waterproof packing comprises: a cylindrical packing body having elasticity and being an annular structure having a first annular inner surface and a first annular outer surface; and a heat transfer member having higher thermal conductivity than the cylindrical packing body, the heat transfer member being provided integrally with the cylindrical packing body, the heat transfer member being an annular structure having a second annular inner surface that is located inside the first annular inner surface of the cylindrical packing body.

10. The waterproof connector according to claim 9, wherein the heat transfer member of the waterproof packing is formed of metal, the heat transfer member being configured to transfer heat from the connector housing.

11. A wire harness comprising:
    at least one electrically conductive path;
    a waterproof connector provided at an end of the at least one electrically conductive path;
    a tubular shield member configured to cover the at least one electrically conductive path; and
    a shield shell provided on an end of the tubular shield member, the shield shell being configured to be attached to a metal case of an object to which the wire harness is connected,
    wherein the waterproof connector comprises:
    a waterproof packing; a connector housing to which the waterproof packing is attached on an outer side of the connector housing; and
    a terminal configured to be connected to an end of the at least one electrically conductive path, the terminal being accommodated inside the connector housing,
    wherein the waterproof packing comprises:
    a cylindrical packing body having elasticity and being an annular structure having a first annular inner surface and a first annular outer surface; and
    a heat transfer member having higher thermal conductivity than the cylindrical packing body, the heat transfer member being provided integrally with the cylindrical packing body, the heat transfer member being an annular structure having a second annular inner surface that is located inside the first annular inner surface of the cylindrical packing body,
    wherein the heat transfer member of the waterproof packing is formed of metal, the heat transfer member being configured to transfer heat from the connector housing, and
    wherein the heat transfer member is configured to transfer the heat from the connector housing of the waterproof connector to the metal case when the waterproof packing of the waterproof connector is inserted into an insertion hole of the metal case.

* * * * *